(12) United States Patent
Gamboa (10) Patent No.: US 10,618,579 B2
(45) Date of Patent: Apr. 14, 2020

(54) AUTONOMOUS CRAWLING ASSEMBLY SYSTEM

(71) Applicant: The Boeing Company, Chicago, IL (US)

(72) Inventor: James Darryl Gamboa, Anaheim, CA (US)

(73) Assignee: The Boeing Company, Chicago, IL (US)

( * ) Notice: Subject to any disclaimer, the term of this patent is extended or adjusted under 35 U.S.C. 154(b) by 667 days.

(21) Appl. No.: 15/188,615

(22) Filed: Jun. 21, 2016

(65) Prior Publication Data

US 2016/0297547 A1 Oct. 13, 2016

Related U.S. Application Data

(62) Division of application No. 13/663,838, filed on Oct. 30, 2012, now Pat. No. 9,475,527.

(51) Int. Cl.
*B62D 57/024* (2006.01)
*B64F 5/10* (2017.01)

(52) U.S. Cl.
CPC .............. *B62D 57/024* (2013.01); *B64F 5/10* (2017.01); *Y10T 29/53983* (2015.01)

(58) Field of Classification Search
CPC .... B62D 57/024; B64F 5/10; Y10T 29/53983
See application file for complete search history.

(56) References Cited

U.S. PATENT DOCUMENTS 3,167,145 A 1/1965 Mackie
3,246,711 A 4/1966 Snoeyenbos
(Continued)

FOREIGN PATENT DOCUMENTS

CA 2030491 10/1995
CN 201079850 7/2008
(Continued)

OTHER PUBLICATIONS

Chinese Office Action for Chinese Patent Application No. 201410373377.1 dated Jul. 26, 2017.
(Continued)

*Primary Examiner* — David P Bryant
*Assistant Examiner* — Nirvana Deonauth
(74) *Attorney, Agent, or Firm* — Kunzler Bean & Adamson (57) ABSTRACT

An automated motorized device may be configured to move on a structure for use in assembling of the structure. The automated motorized device may comprise an end effector configured to perform a plurality of assembling related functions; a first movement assembly, comprising a first plurality of dual function movement components; a second movement assembly, comprising a second plurality of dual function movement components; and a pivoting component connected concentrically to the end effector, and to at least one of the first movement assembly and the second movement assembly. Functions of each dual function movement component may comprise adhering and gliding; and during movement of the automated motorized device, one of the first movement assembly and the second movement assembly is secured to the structure while the other one of the first movement assembly and the second movement assembly moves over the structure.

11 Claims, 7 Drawing Sheets

(56) References Cited

U.S. PATENT DOCUMENTS

| | | |
|---|---|---|
| 3,892,287 A | 7/1975 | Bennett et al. |
| 4,470,585 A | 9/1984 | Bavelloni |
| 4,664,212 A | 5/1987 | Nagatsuka et al. |
| 4,926,957 A | 5/1990 | Urakami |
| 4,997,052 A | 3/1991 | Urakami |
| 5,161,631 A | 11/1992 | Urakami |
| 5,468,099 A | 11/1995 | Wheetley et al. |
| 5,633,707 A | 5/1997 | Seemann |
| 5,657,972 A | 8/1997 | Blatt |
| 5,890,553 A * | 4/1999 | Bar-Cohen ............ B62D 57/02 180/8.1 |
| 6,357,101 B1 | 3/2002 | Sarh et al. |
| 6,413,022 B1 | 7/2002 | Sarh |
| 6,536,100 B2 | 3/2003 | Sarh et al. |
| 6,729,809 B2 | 5/2004 | Sarh et al. |
| 7,003,860 B2 | 2/2006 | Bloch et al. |
| 7,174,982 B2 | 2/2007 | Kraus |
| 7,311,162 B2 | 12/2007 | Jeswine et al. |
| 7,380,776 B2 | 6/2008 | Boyl-Davis et al. |
| 7,416,176 B2 | 8/2008 | Hamann |
| 8,006,362 B2 | 8/2011 | Sarh |
| 8,019,472 B2 | 9/2011 | Montero Sanjuan et al. |
| 8,490,955 B2 | 7/2013 | Sarh et al. |
| 8,573,070 B2 | 11/2013 | Sarh et al. |
| 9,327,376 B2 | 5/2016 | Gamboa |
| 2004/0262866 A1 | 12/2004 | Kraus |
| 2005/0263949 A1 | 12/2005 | Boyl-Davis et al. |
| 2006/0277733 A1 | 12/2006 | Boyl-Davis et al. |
| 2007/0132255 A1 | 6/2007 | Perlman et al. |
| 2007/0235239 A1 | 10/2007 | Urakami |
| 2008/0077276 A1 | 3/2008 | Montero Sanjuan et al. |
| 2010/0071192 A1 | 3/2010 | Sarh et al. |
| 2012/0014759 A1* | 1/2012 | Sarh ..................... B62D 57/024 408/76 |
| 2012/0193500 A1 | 8/2012 | Kniss et al. |
| 2012/0210802 A1 | 8/2012 | Sarh et al. |
| 2013/0285399 A1 | 10/2013 | Sarh et al. |
| 2014/0115860 A1 | 5/2014 | Sarh et al. |
| 2014/0237793 A1 | 8/2014 | Gamboa |
| 2016/0200454 A1 | 7/2016 | Gamboa |

FOREIGN PATENT DOCUMENTS

| | | |
|---|---|---|
| CN | 101259858 | 9/2008 |
| CN | 101856731 | 10/2010 |
| CN | 102107371 | 6/2011 |
| CN | 102152818 | 8/2011 |
| CN | 201920661 | 8/2011 |
| CN | 102578975 | 7/2012 |
| EP | 0430161 | 6/1991 |
| EP | 1757514 | 2/2007 |
| GB | 2486013 | 6/2012 |
| JP | 60092173 | 5/1985 |
| JP | 60219172 | 11/1985 |
| JP | 03-266781 | 11/1991 |
| KR | 100866843 | 11/2008 |
| WO | 2005105557 | 11/2005 |
| WO | 2008130193 A1 | 10/2008 |
| WO | 2012012034 | 1/2012 |

OTHER PUBLICATIONS

Chinese Office Action for Chinese Application No. 201380052963.X dated Feb. 21, 2017 with English translation.
Canadian Office Action for Canadian Patent Application No. 2,853,847 dated Mar. 6, 2017.
Chinese Office Action for Chinese Patent Application No. 201380056752.3 dated Mar. 10, 2017.
Chinese Office Action for Chinese Application No. 201380056752.3 dated Nov. 1, 2016.
Canadian Office Action for Canadian Patent Application No. 2,853,847 dated Oct. 23, 2017.
English translation of Search Report and Office Action for Chinese Patent Application No. 201380056752.3 dated Apr. 29, 2016.
PCT/US2013/059842 International Search Report and Written Opinion dated Jan. 29, 2014.
PCT/US2013/058057 International Search Report and Written Opinion dated Nov. 28, 2013.
Extended European Search Report, Patent Application No. 14178423.1 dated Jan. 22, 2015.
Office Action for Canadian Application No. 2,853,847 dated Jul. 24, 2015.
Office Action for Canadian Patent Application No. 2,885,514 dated Feb. 12, 2016.
Notice of Allowance for U.S. Appl. No. 13/957,000 dated Jun. 8, 2018.
English translation and Japanese Office Action for Japanese Patent Application No. 2014-156014 dated May 21, 2018.
English translation and Chinese Office Action for Chinese Patent Application No. 201410373377.1 dated Apr. 9, 2018.

* cited by examiner

AUTONOMOUS CRAWLING ASSEMBLY SYSTEM

FIELD

Certain embodiments of the disclosure relate to manufacturing and more specifically to component assembly during aircraft manufacturing. More specifically, certain embodiments of the disclosure relate to an apparatus and method for an autonomous crawling assembly system.

BACKGROUND

Manufacturers, including aircraft manufactures for example, are under continuous pressure to reduce costs associated with and/or enhance efficiency of manufacturing processes. In this regard, manufacturing a particular article (e.g., aircraft) may require performing various steps to produce a complete example of the article. The type of steps undertaken in a manufacturing process may be dictated by the article itself (e.g., number, size, and/or shape of components), and/or by other conditions pertinent to the manufacturing process (e.g., separate production of components of the article). For example, manufacturing aircraft may require assembling components, such as fuselage or wing sections, which may be made separately, sometimes at different locations and/or by different sub-contractors. In some instances, automated devices may be utilized during manufacturing processes. In this regard, automated devices may be fixed, with the manufactured article (or components thereof) may be moved (e.g., via an assembly line) to allow the automated devices to operate (e.g., applying fastening bolts). Alternatively, the automated devices may be configured as moving devices that traverse the manufactured article (or component(s) thereof) while operating on the article (or component(s)). For example, in aircraft manufacturing automated systems capable of crawling over aircraft structures may be used, being configured to accurately position at particular location (e.g., over a fastener location), and to perform necessary operations thereat (e.g., processing the needed hole and installing a fastener).

Use of such automated systems may pose certain challenges, however. For example, challenges associated with this type of automated systems may include or relate to performing necessary course adjustments and/or enhancing the manner by which in which the system moves from one location to the next. In this regard, many currently available systems suffer from such limitations as low speed of movement over structure and/or skidding during course adjustments, as a result of, for example, the means currently used in securing such automated systems to the structures and/or moving them on these structures. For example, some current systems may utilize vacuum cups to adhere the system to structures. Use of such vacuum cups, however, may necessitate deactivating the vacuum cup and pulling them away from structure before movement of the system. As for course adjustments, current systems may utilize rotation of support legs or feet to turn the system and make course adjustments. This, however, may lead to skidding of the pressure foot and is a less controlled steering method.

Therefore, it would be advantageous to have an apparatus and method for providing automated assembly in a manner that enhances speed and/or movement of machines used during assembly of articles, such as aircraft.

Further limitations and disadvantages of conventional and traditional approaches will become apparent to one of skill in the art, through comparison of such systems with some aspects, as set forth in the remainder of the present application with reference to the drawings.

SUMMARY

An apparatus and/or method is provided for an autonomous crawling assembly system, substantially as shown in and/or described in connection with at least one of the figures, as set forth more completely in the claims.

In one aspect, an apparatus may be used in assembling or manufacturing operations, comprising an automated motorized device that is operable to move on a structure for use in assembling of the structure. The automated motorized device may comprise an end effector configured to perform a plurality of assembling related functions; a first movement assembly, comprising a first plurality of dual function movement components; a second movement assembly, comprising a second plurality of dual function movement components; and a pivoting component connected concentrically to the end effector, and to at least one of the first movement assembly and the second movement assembly. In this regard, functions of each dual function movement component may comprise adhering and gliding; and during movement of the automated motorized device, one of the first movement assembly and the second movement assembly is secured to the structure while the other one of the first movement assembly and the second movement assembly moves over the structure.

In another aspect, a method for performing assembling or manufacturing operations using an automated motorized device, which may be operable to move on a structure for use in assembling of the structure, may comprise positioning an end effector of the automated motorized device, at each of a plurality of predetermined locations of the structure, with the end effector being configured to perform a plurality of assembling related functions, and the end effector being configured to apply one or more of the plurality of assembling related functions at each of the plurality of predetermined locations. The method may further comprise moving the automated motorized device to each of the plurality of predetermined locations by use of a first movement assembly and a second movement assembly, wherein: the first movement assembly comprises a first plurality of dual function movement components, the second movement assembly comprises a second plurality of dual function movement components, functions of each of the dual function movement components comprise adhering and gliding, and moving of the automated motorized device comprises securing one of the first movement assembly and the second movement assembly to the structure while the other one of the first movement assembly and the second movement assembly moves over the structure.

These and other advantages, aspects and novel features, as well as details of an illustrated embodiment thereof, will be more fully understood from the following description and drawings.

The features, functions, and advantages that have been discussed can be achieved independently in various embodiments or may be combined in yet other embodiments further details of which can be seen with reference to the following description and drawings.

DETAILED DESCRIPTION

Certain embodiments may be found in a method and system for an autonomous crawling assembly system. Many specific details of certain embodiments are set forth in the following description as well as the drawings to provide a thorough understanding of such embodiments. One skilled in the art, however, will understand that there may be additional embodiments, or that certain of these embodiments may be practiced without several of the details described in the following description. Like numbers refer to like elements throughout.

As utilized herein the terms "circuits" and "circuitry" refer to physical electronic components (i.e. hardware) and any software and/or firmware ("code") which may configure the hardware, be executed by the hardware, and or otherwise be associated with the hardware. As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the terms "block" and "module" refer to functions than can be performed by one or more circuits. As utilized herein, the term "exemplary" means serving as a non-limiting example, instance, or illustration. As utilized herein, the term "e.g.," introduces a list of one or more non-limiting examples, instances, or illustrations.

Figure 1:
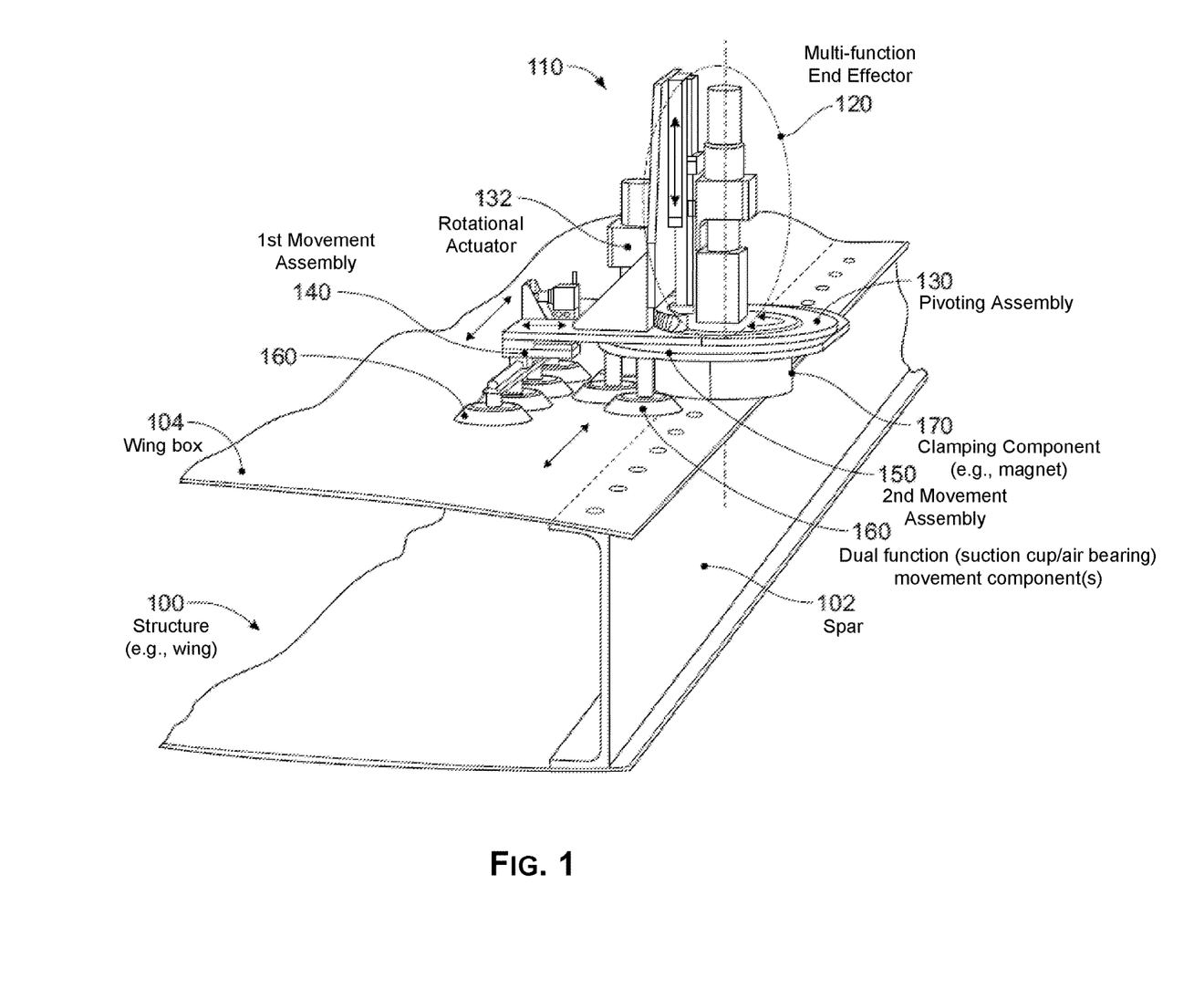
FIG. 1 is a diagram illustrating an autonomous crawling assembly system that may be used during assembly of component(s), such as during manufacturing of aircraft, in accordance with an advantageous embodiment.

FIG. 1 is a diagram illustrating an autonomous crawling assembly system that may be used during assembly of component(s), such as during manufacturing of aircraft, in accordance with an advantageous embodiment. Referring to FIG. 1, there is shown a crawler 110.

The crawler 110 may be a portable, automated motorized device which may be operable to move a physical target, such as an assembly or component that may be used in performing particular operations (e.g., a drilling, bolting, and/or fastening), in a controlled manner. For example, the crawler 110 may be used during manufacturing and/or assembly of aircraft or components thereof (e.g., fuselage or wings). In this regard, the crawler 110 may preferably be placed on a structure 100 (e.g., wing of aircraft), and may then move over the structure 100 while performing assembling related operations thereon, at different locations (e.g., intended bolting positions on the wing).

The crawler 110 may comprise a plurality of components performing various operations in support of intended functions of the crawler 110. For example, the crawler 110 may comprise a multi-function end effector 120, a pivoting assembly 130, a first movement assembly 140 and a second movement assembly 150, and a clamping component 170. The multi-function end effector 120 may be configured to perform one or more assembling related operations or functions, which may be utilized during manufacturing of articles, such as aircraft or components thereof. For example, the multi-function end effector 120 may be configured to perform such functions as drilling bolting holes and/or applying fastening bolts. Use of such functions may be made, for example, during assembling of aircraft wings. In this regard, assembling functions applied by the multi-function end effector 120 to the wing 100 may enable bolting a spar 102 to a wing box 104.

The first movement assembly 140 and the second movement assembly 150 may enable, individually and/or in combination, moving the crawler 110 along the structure (e.g., the wing 100, or more specifically the wing box 104) to which the functions of the multi-function end effector 120 may be applied. In this regard, the first movement assembly 140 and the second movement assembly 150 may be configured such as to provide, while operating individually and/or in combination, autonomous movement of the crawler 110, in a controlled manner that may enable optimizing operation of the crawler 110 (and/or functions performed thereby—e.g., assembling related functions), such as by enhancing speed of movement of the crawler 110 without compromising (or even with improvement to) the holding (or securing of) the crawler 110 to the structure 100. This may be achieved, for example, by incorporating into each of the first movement assembly 140 and the second movement assembly 150 a plurality of dual function movement components 160. In this regard, each dual function movement component 160 may be configured to provide multiple functions related to support and movement of the crawler 110. The dual function movement component 160 may be configured to provide, for example, both of an adhering or a holding function (e.g., relating to securing the crawler 110 to the structured being traversed), and a gliding or a hovering function (e.g., relating to moving the crawling over the structured being traversed). For example, the dual function movement component 160 may comprise a suction cup/air bearing assembly that may be configured to provide a securing function—i.e., enabling 'holding' the corresponding movement assembly (first or second)—by use of vacuum created via the suction cup; and to provide the 'gliding' or 'hovering' function—i.e., facilitating moving or sliding of the corresponding movement assembly (first or second)—by use of air bearing (e.g., hovering) over the structure.

In some instances, to enhance use of the movement components of the crawler 110 (e.g., the first movement assembly 140 and the second movement assembly 150), the crawler 110 may comprise pivoting means (e.g., the pivoting assembly 130), which may be used to allow for (when needed) rotating of particular components of the crawler 110, preferable in a controlled manner and/or independent of other components of the crawler 110. For example, the pivoting assembly 130 may comprise one or more pivoting components, which may allow for rotating or pivoting of particular components of the crawler 110, such as the multi-function end effector 120, the first movement assembly 140, and/or the second movement assembly 150 which may allow for rotating one or more of these components while the other component(s) or the crawler 110 is secured to the structure. Doing so may enhance movement of the crawler 110, such as by allowing at least part of any required movement adjustments to be performed while the crawler 110 is being utilized for its intended function (e.g., while the multi-function end effector 120 is being utilizing to apply assembling related functions). To further enhance operation of the crawler 110, a rotation actuator 132 may be incorporated into the pivoting assembly 130, which may ensure the multi-function end effector 120 remains unmoved (e.g., while it is being utilizing to apply assembling related functions) even while one or both of the first movement assembly 140 and the second movement assembly 150 may be rotated or pivoted.

In an implementation, the crawler 110 may comprise clamping or securing means (e.g., the clamping component 170), which may be used to ensure that the multi-function end effector 120 is firmly secured to the structure 100 to which the assembling functions are applied by the multi-function end effector 120. For example, the clamping component 170 may comprise a non-permanent magnet which may be activated (e.g., using electric current) when the multi-function end effector 120 needs to be secured to the structure (e.g., when the multi-function end effector 120 is positioned at a location on the wing box 104 where a fastening bolt is to be applied); otherwise, the magnet which may be deactivated, such as when the crawler 100 (or parts thereof, such as the multi-function end effector 120) may be moving.

In an implementation, the crawler 110 may also comprise one or more motors (not shown), which may be utilized to enable and/or support the automated motorized movement of the crawler 110, such as by driving and/or enabling functions of at least some of components of the crawler 110 used in conjunction with movement and/or use of the crawler 110 (e.g., rotating/securing component of the multi-function end effector 120, the first movement assembly 140, and/or second movement assembly 150).

In an implementation, the crawler 110 may comprise a controller component (not shown) for controlling various operations and/or components of the crawler 110. In this regard, the controller component may comprise a programmable circuitry providing control signals to at least some of the components of the crawler 110, to enable configuring these components to perform various operations in support of the functions of the crawler 110. For example, the controller component may control operations of the movement component of the crawler 110.

In an implementation, the crawler 110 may be configured to receive and/or transmit information, such as by incorporating a communication component for providing and/or handling communications to and/or from the crawler 110. In this regard, the crawler 110 may receive, for example, user input, which may be used in controlling and/or adjusting various operations or functions of the crawler 110. The user input may comprise, for example, movement related commands, such as "start" or "stop" and/or other similar commands. The communication component may also be configured to enable transmitting status information, such as information relating to various components or functions of the crawler 110. The status information may be transmitted to other devices that may be utilized by users (e.g., a computer). The reception and/or transmission may be performed wirelessly, using one or more appropriate technologies. For example, communications may be via infra-red (IR) signals, near field communication (NFC) signals, Bluetooth signals, and/or WiFi signals. This disclosure is not limited, however, to any particular communication technology.

Figure 2:
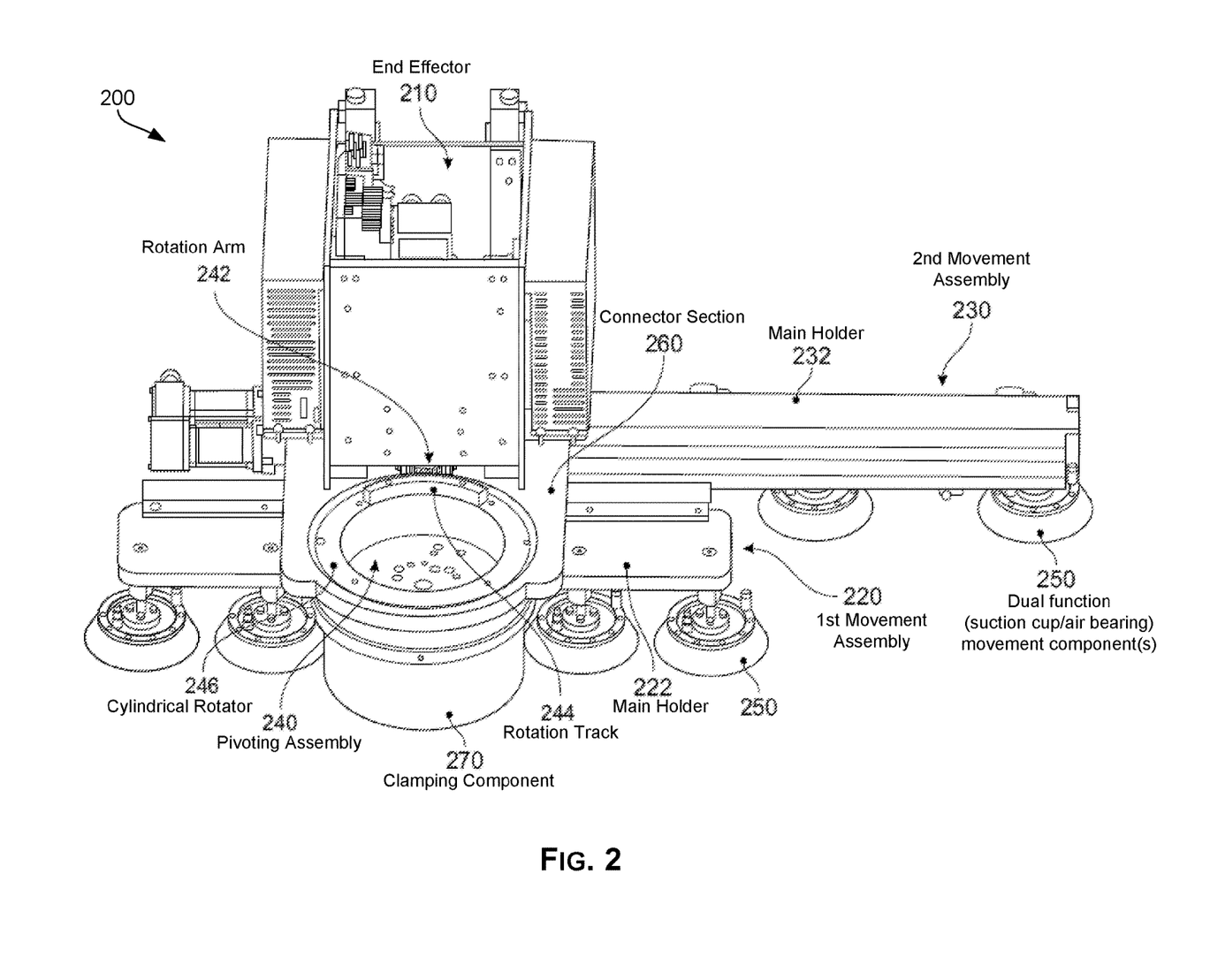
FIG. 2 is a diagram illustrating an autonomous crawling assembly system that may be used during assembly of component(s), such as during manufacturing of aircraft, in accordance with an advantageous embodiment.

FIG. 2 is a diagram illustrating an autonomous crawling assembly system that may be used during assembly of component(s), such as during manufacturing of aircraft, in accordance with an advantageous embodiment. Referring to FIG. 2, there is shown a crawler 200.

The crawler 200 may represent an implementation of the crawler 110, as described with respect to FIG. 1. In this regard, as with the crawler 110, the crawler 200 may be a portable, automated motorized device which may be configured to move over a structure, to apply manufacturing and/or assembling related functions or operations thereto. In particular, the crawler 200 may be configured for use during manufacturing and/or assembly of aircraft or components thereof (e.g., fuselage or wings). In this regard, the crawler 200 may preferably be placed on the structure (e.g., the wing 100 of FIG. 1), and may then move over the structure 100 while performing assembling related operations thereon, at different locations (e.g., intended bolting positions on the wing(s)).

In various implementations, the crawler 200 may be configured to move and/or operate in optimized manner compared to existing systems. In this regard, there may be various challenges associated with use of automated assembling systems, particularly with respect to course adjustments and/or the manner by which in which the system moves from one location to the next. For example, many currently available systems suffer from such limitations as low speed of movement over structure(s) and/or skidding during course adjustments, as a result of currently used means for securing or holding such automated systems to the structures and/or for moving them (or adjusting the course of movement) on the structure(s). To achieve the desired enhancements in terms of speed of movement, course or movement adjustments, and/or reliability of system's 'holding' onto the structure(s), the crawler 200 may incorporate various components (or enhancements to components). The crawler 200 may incorporate, for example, a plurality of movement assemblies, to enable performing at least a portion of required movement (or adjustment of course thereof) while the crawler 200 is being used to apply assembling related functions. In this regard, these movement assemblies may comprise movement components that support multiple functions related to movement operations, which may allow for configuring some movement components (e.g., those of particular movement assembly) to perform one function (e.g., 'holding' or 'securing') while other movement components (e.g., those of another movement assembly) are being configured to perform another function (e.g., movement related functions, such as 'gliding' or 'sliding' for example). The crawler 200 may also incorporate dedicated components that may allow rotating the movement related assemblies (or components thereof) in a manner that ensures and/or maintains the overall system's hold onto the structure—i.e., preventing any skidding or falling off the structure—including when the rotating is done while the crawler 200 is being used in applying assembling related functions. For example, the crawler 200 may comprise an end effector 210, a first movement assembly 220 and a second movement assembly 230, a pivoting assembly 240, a connector section 260, a clamping component 270. Some examples of operations of the crawler 200, and/or use of components thereof during such operations, are described in the following paragraphs relating to FIGS. 3, 4A, and 4B.

The end effector 210 may be substantially similar to the multi-function end effector 120, as described with respect to FIG. 1. In this regard, end effector 210 may be configured to perform one or more assembling related operations or functions, which may be utilized during, for example, manufacturing or assembling of aircraft or components thereof. For example, the end effector 210 may be configured to perform such operations or functions as drilling bolting holes and/or applying fastening bolts.

The first movement assembly 220 and the second movement assembly 230 may be substantially similar to first movement assembly 140 and the second movement assembly 150, respectively, of FIG. 1. In this regard, the first movement assembly 220 and the second movement assembly 230 may be configured to enable, individually and/or in combination, moving the crawler 200 along a structure (e.g., a wing) to which the functions of the end effector 210 may be applied. Each of the first movement assembly 220 and the second movement assembly 230 may comprise a main holder (222 and 232, respectively), to which a plurality of dual function movement components 250 may be attached. In this regard, each dual function movement component 250 may be configured to provide multiple functions related to movement of the crawler 200. The dual function movement component 250 may be configured to provide, for example, both an 'adhering' function (e.g., relating to 'securing' or 'holding' the crawler 200 to the structured being traversed) and a 'gliding' function (e.g., relating to moving, preferably with as little resistance as possible, the crawler 200 over the structured being traversed). For example, each dual function movement component 250 may comprise combination of suction cup/air bearing elements, which may be configured to provide the adhering function (i.e., enabling 'holding' to the structure) by means of vacuum created via the suction cup; and to provide the 'gliding' or 'hovering' function (i.e., facilitating moving or sliding over the structure) by use of air bearing (e.g., hovering). In some instances, the main holders 222 and 232 may also be configured to provide additional function(s), beyond simply attaching the dual function movement component(s) 250 to the movement assemblies. For example, the main holders 222 and 232 may incorporate flexible and/or movable elements that may allow for bending—that is to allow for application of the dual function movement component(s) 250 in curved manner as to accommodate for curves or contours of the structure along the movement path.

The pivoting assembly 240 may comprise a plurality of elements or components which may be configured to allow for, when needed, rotating or pivoting (including, in some instances, three-dimensionally) of particular components of the crawler 200, preferable in a controlled manner and/or independent of other components of the crawler 200. In addition, and further enhancing operation of the crawler 200, the pivoting assembly 240 may be configured to perform at least some pivoting or rotating required for movement adjustments while the crawler 200 is being used (e.g., while the end effector 210 is utilized in applying assembling related functions). The pivoting assembly 240 may comprise, for example, a rotating arm 242, a rotating track 244, and a cylindrical rotator 246, which may be configured to allow for rotating or pivoting of particular components of the crawler 200, such as the end effector 210, the first movement assembly 220, and/or the second movement assembly 230. In this regard, the rotating arm 242 (not shown in FIG. 2) may be configured to pivot or rotate, such as by moving along the rotation track 244 (using gears or teeth). Thus, by attaching an end of the rotating arm 242 to a movement assembly (e.g., the second movement assembly 230), the movement assembly may be rotated or pivoted relative to the other movement assemblies (e.g., the second movement assembly 230). The cylindrical rotator 246 may be configured to allow for rotating or pivoting of another movement assembly. In this regard, the cylindrical rotator 246 may be used, for example, for rotating that movement assembly, or to maintain position of that movement assembly as other movement assemblies are being pivoted or rotated via the rotating arm 242. The cylindrical rotator 246 may be used in similar manner to rotate (or maintain position of) the end effector 210.

The connector section 260 may connect the first movement assembly 220 and the second movement assembly 230. The connector section 260 may comprise a 'track' or 'rail' element, to allow the second movement assembly 230 to slide through the connector section 260 for example. In other words, the connector section 260 may be connected to the second movement assembly 230 such that connection point(s) between the connector section 260 and the assembly main holder (232) may be adjusted along the main holder (232), thus allowing for straight movement of the second movement assembly 230 relative to the connector section 260. On the other hand, the connector section 260 may be connected to the first movement assembly 220 such that the connection point(s) between the connector section 260 and the assembly main holder (222) may be fixed along the main holder (222), but may allow for rotational (pivotal) adjustments. In other words, the connector section 260 and the first movement assembly 220 may be rotated relative to one another (e.g., via the pivoting assembly 240).

The clamping component 270 may be similar to the clamping component 170, as described with respect to FIG. 1. In this regard, the clamping component 270 may be configured to support securing the crawler 200 or component(s) thereof (e.g., the end effector 210), such as when the end effector 210 is engaged in applying assembling related functions at particular location (e.g., bolt position on a wing structure). For example, the clamping component 270 may incorporate a non-permanent magnet which may be activated (e.g., using electric current) to apply the required clamping (e.g., when the end effector 210 is being secured to the structure), and deactivated otherwise.

Figure 3:
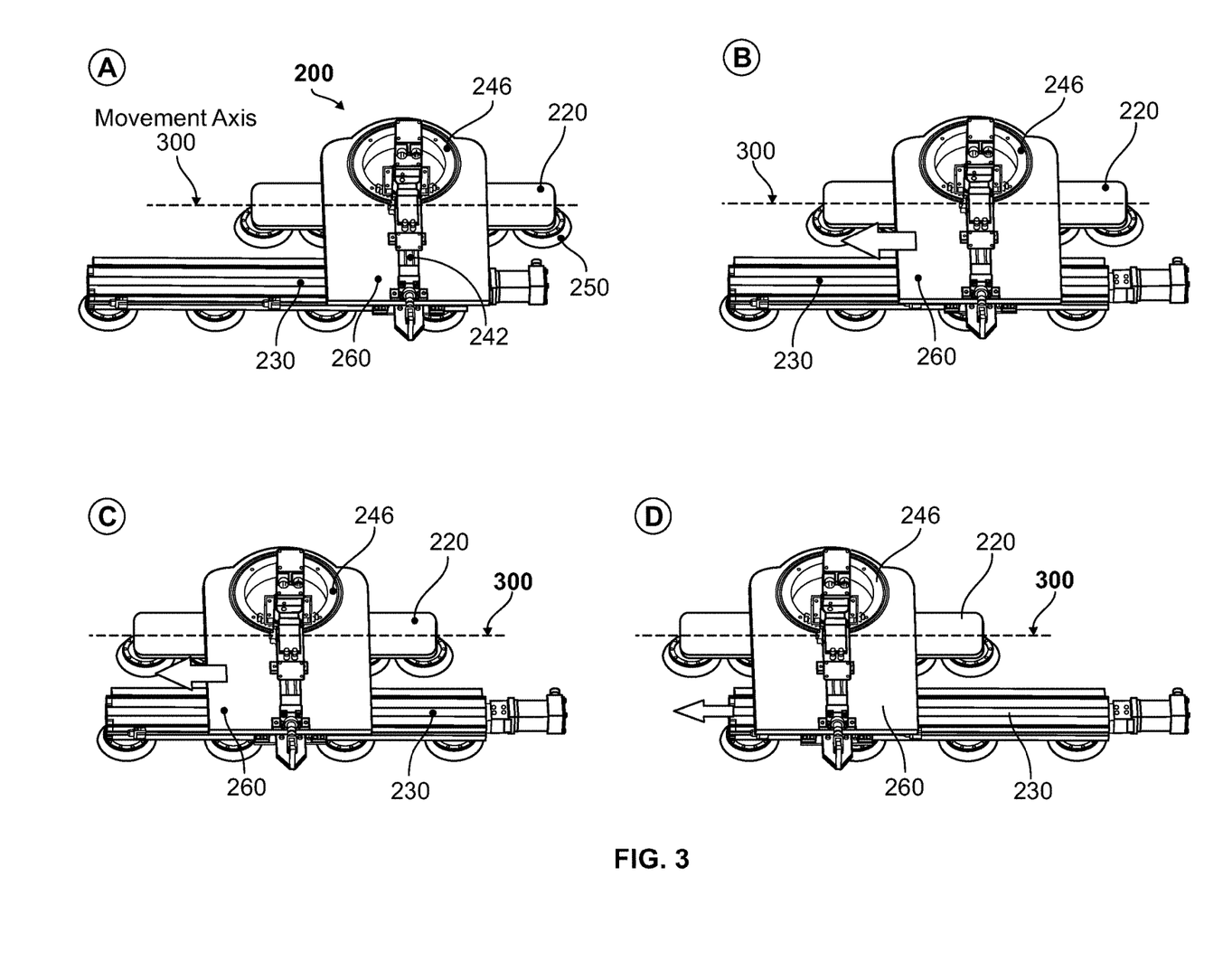
FIG. 3 is a diagram illustrating movement of an autonomous crawling assembly system that comprises multiple dual function movement components, in accordance with an advantageous embodiment.

FIG. 3 is a diagram illustrating movement of an autonomous crawling assembly system that comprises multiple dual function movement components, in accordance with an advantageous embodiment. Referring to FIG. 3, there is shown the crawler 200 of FIG. 2.

In operation, the crawler 200 may be used to apply assembling related functions at multiple locations, with the first movement assembly 220 and the second movement assembly 230 being configured to provide enhanced automated movement between the locations where the assembling functions are applied. In this regard, (A) to (D) may depict, by way of example, a sequence of movements of crawler 200 as a whole, and/or the end effector (210) in particular, and/or operations or adjustment of the movement assemblies (220 and 230) during application of assembling related functions at multiple locations. For example, as shown in (A), the end effector (210) of the crawler 200 may apply assembling related functions at an initial location of a structure (not shown). In this regard, during application of the assembling related functions, the end effector (210) may be secured, such as by use of its clamping component (270), and in addition by use of at least one of the first movement assembly 220 and the second movement assembly 230, such as by engaging one or more of the dual function movement component(s) 250 to provide 'holding' onto the structure as described in FIGS. 1 and 2.

In (B), the end effector (210) of the crawler 200 may be moved into another location, to apply assembling related functions therein. In this regard, to facilitate movement of the end effector (210), the first movement assembly 220, to which the end effector (210) may be attached, may be slid forward (in the direction of movement). In this regard, sliding the first movement assembly 220 may be performed by engaging its dual function movement component(s) 250 to provide 'gliding' over the structure, as described in FIGS. 1 and 2. Furthermore, to ensure that the movement of the end effector (210) is done in secured manner—i.e., no skidding or falling off the structure would occur during the move—the second movement assembly 230 may be used to secure the crawler 200 to the structure, such as by engaging its dual function movement component(s) 250 to provide 'holding' onto the structure. The connector section 260 may allow for sliding the portion of the crawler 240 comprising the first movement assembly 220 and the end effector (210) attached over the main holder (232) of the second movement assembly 230.

In (C), the end effector (210) of the crawler 200 may be moved, again, such as into another location, in a similar manner, to apply assembling related functions therein. In this regard, movement of the end effector (210) may be achieved, again, by sliding the first movement assembly 220 (to which the end effector (210) is attached) further forward (in the direction of movement), while the second movement assembly 230 is being used in securing the crawler 200 to the structure.

In (D), as the end effector (210) of the crawler 200 is applying assembling related functions at the current location, the second movement assembly 230 may be slid forward (in the direction of movement 300), such as by sliding its main holder 232 through a rail in the connector section 260. This sliding forward of the second movement assembly 230 may enable continuation of movement of the end effector (210), by 'resetting' the second movement assembly 230 to continue providing 'holding' support while the end effector (210) is being moved (e.g., by gliding the first movement assembly 220). In other words, the second movement assembly 230 may be slid forward to return to the initial position depicted in (A). In this regard, sliding the second movement assembly 230 may be performed while the end effector (210) of the crawler 200 is engaged in applying assembling related functions. Also, during sliding of the second movement assembly 230, its dual function movement component(s) 250 may be engaged to provide gliding over the structure. Furthermore, during sliding of the second movement assembly 230, the end effector (210) may remain secured, such as use of its clamping component (270) and/or by the first movement assembly 220, such as by engaging its dual function movement component(s) 250 to provide holding onto the structure.

Figure 4A:
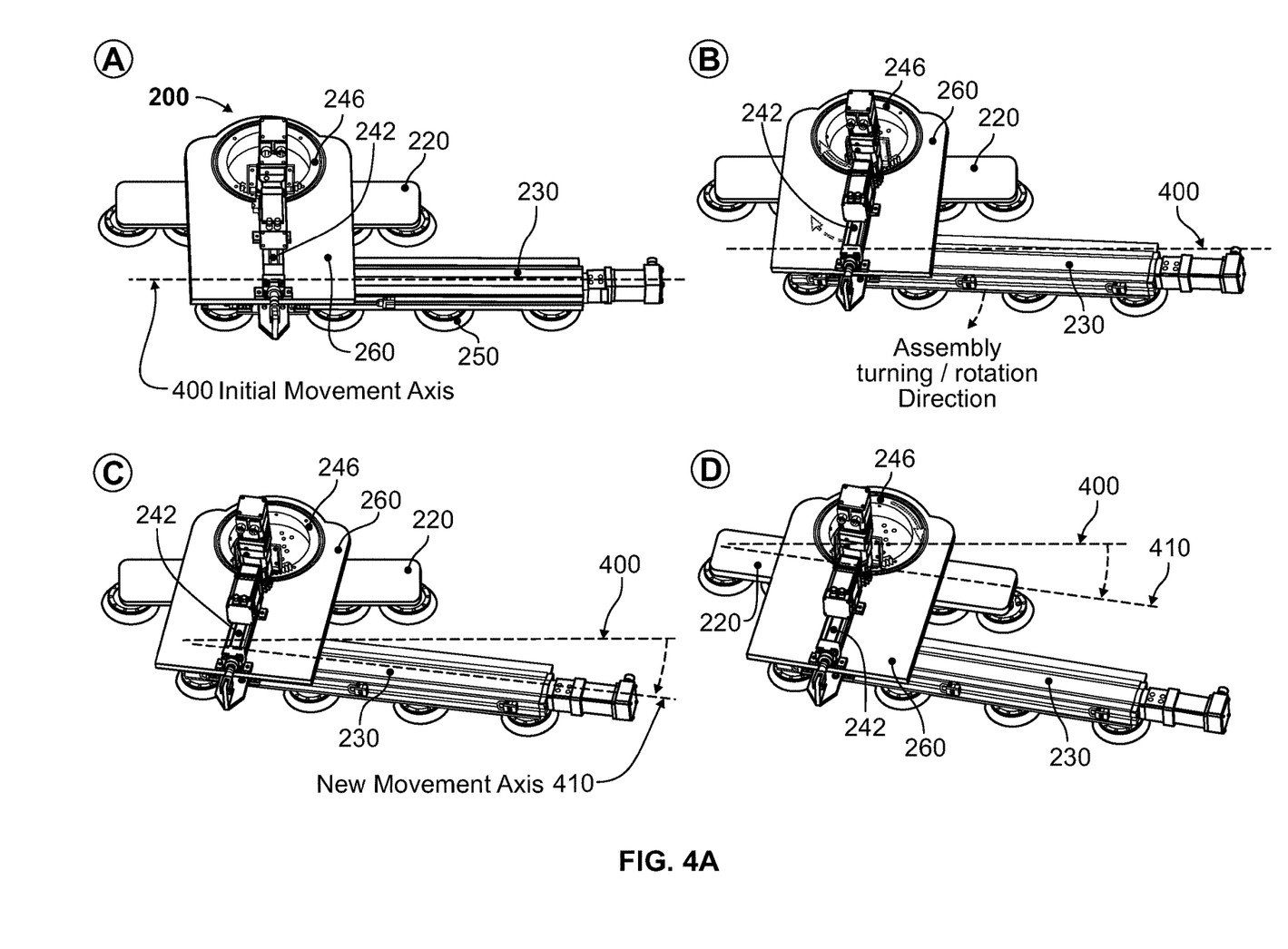
FIG. 4A is a diagram illustrating rotation and adjustment of movement direction of an autonomous crawling assembly system that comprises multiple dual function movement components, in accordance with an advantageous embodiment.

FIG. 4A is a diagram illustrating rotation and adjustment of movement direction of an autonomous crawling assembly system that comprises multiple dual function movement components, in accordance with an advantageous embodiment. Referring to FIG. 4A, there is shown the crawler 200 of FIG. 2.

In operation, during use of the crawler 200 in assembling structures (not shown), such as structure 100 of FIG. 1, adjustments to course (direction) of movement may be required as the end effector (210) is being moved to different locations on the structure(s), to apply assembling related functions therein. The course adjustments may comprise, for example, or rotations that be necessitated by, for example, the need to accommodate edges, turns, angles, or curves in the structure(s). In an implementation, the first movement assembly 220 and the second movement assembly 230 may be configured to provide optimized course adjustments as part of the overall enhanced automated movement of the crawler 200 between the locations. For example, to optimize performance of the crawler 200, at least some of the required actions for course adjustments may be performed while the end effector (210) is being used to apply assembling related functions, thus reducing delays and enhancing overall speed of movement (and thus optimizing assembling activities). A sequence of steps, (A) to (D), shown in FIG. 4A may depict an example of an optimized adjustment of course of movement of the crawler 200 (and/or components thereof) while moving the end effector (210) between multiple locations. For example, as shown in (A), the end effector (210) of the crawler 200 may apply assembling related functions at an initial location of a structure (not shown), in accordance with an original movement direction (axis) 400. In this regard, during application of the assembling related functions, the end effector (210) may be secured to structure, such as by engaging its clamping component (270); and also by use of at least one of the first movement assembly 220 and the second movement assembly 230, such as by engaging one or more of the dual function movement component(s) 250 to provide 'holding' onto the structure.

In (B), as the end effector (210) of the crawler 200 is applying assembling related functions at the current location, adjustment of course of movement may commence. In this regard, as the course of movement adjustment is being performed, the end effector (210) may remain secured to the structure to which the assembling operations is being performed, such as by use of its clamping component (270) and by use of one of the movement assemblies (e.g., the first movement assembly 220, such as by engaging its dual function movement component(s) 250 to provide 'holding' onto the structure). In some instances, the end effector (210) may also continue to apply assembling related function during adjustment to the course of movement. During that time, the other movement assembly (e.g., the second movement assembly 230) may initiate rotating, such as towards a desired new course of movement. In this regard, the dual function movement component(s) 250 of the second movement assembly 230 may be engaged to allow for 'gliding' over the structure (i.e., configured into the 'gliding' or 'hovering' mode). In addition, the pivoting assembly 240, which may be connected concentrically to the end effector (210), may be engaged to allow for controlled rotation of the second movement assembly 230, in a manner that does not affect the end effector (210). In this regard, motor(s) integrated into the crawler 200 (not shown) may, for example, rotate the rotation arm 242 of the pivoting assembly 240 along a circular (or circumferential) geared track (e.g., the rotation track 244), thus rotating the second movement assembly 230 (and the connector section 260) over the structure (e.g., using the 'gliding' of the dual function movement component(s) 250), without affecting positioning of the end effector (210)—e.g., by use of the cylindrical rotator 246, to which the end effector (210) may be connected, and which may allow the connector section 260 to rotate along its threaded (or geared) circumference. In (C), the rotating of the second movement assembly 230 may continue (e.g., by continuing the rotating of rotation arm 242 of the pivoting assembly 240), preferably while the end effector (210) of the crawler 200 continues to apply assembling related functions, until the second movement assembly 230 is aligned with the desired new movement direction (axis) 410.

In (D), the other movement assembly (first movement assembly 220) may be rotated onto the new movement direction (410). In this regard, once it is fully aligned with the new movement direction (410), the second movement assembly 230 may be configured to secure itself into the structure—e.g., by engaging its dual function movement component(s) 250, to provide holding onto the structure. The first movement assembly 220 may now also be rotated into the new movement direction (410). In this regard, the first movement assembly 220 may first be configured into 'gliding' mode—e.g., by engaging its dual function movement component(s) 250 to allow for 'gliding' over the structure. The pivoting assembly 240 may then be configured to rotate the first movement assembly 220. In this regard, the rotation arm 242 of the pivoting assembly 240 (and the connector section 260) may be locked in position, while another element of the pivoting assembly 240 (e.g., the cylindrical rotator 246), to which the end effector (210) and the first movement assembly 220 may be connected, may be engaged to perform a controlled rotation, being driven by, for example, motor(s) that may integrated into the crawler 200 (not shown). In this regard, the cylindrical rotator 246 may be configured to rotate independent of rotation arm 242 (i.e., as it remains in position), and with the second movement assembly 230 being 'locked' along the new movement direction (410). The rotation of the cylindrical rotator 246 may continue until the first movement assembly 220 is also fully aligned with the desired new movement direction (410).

Figure 4B:
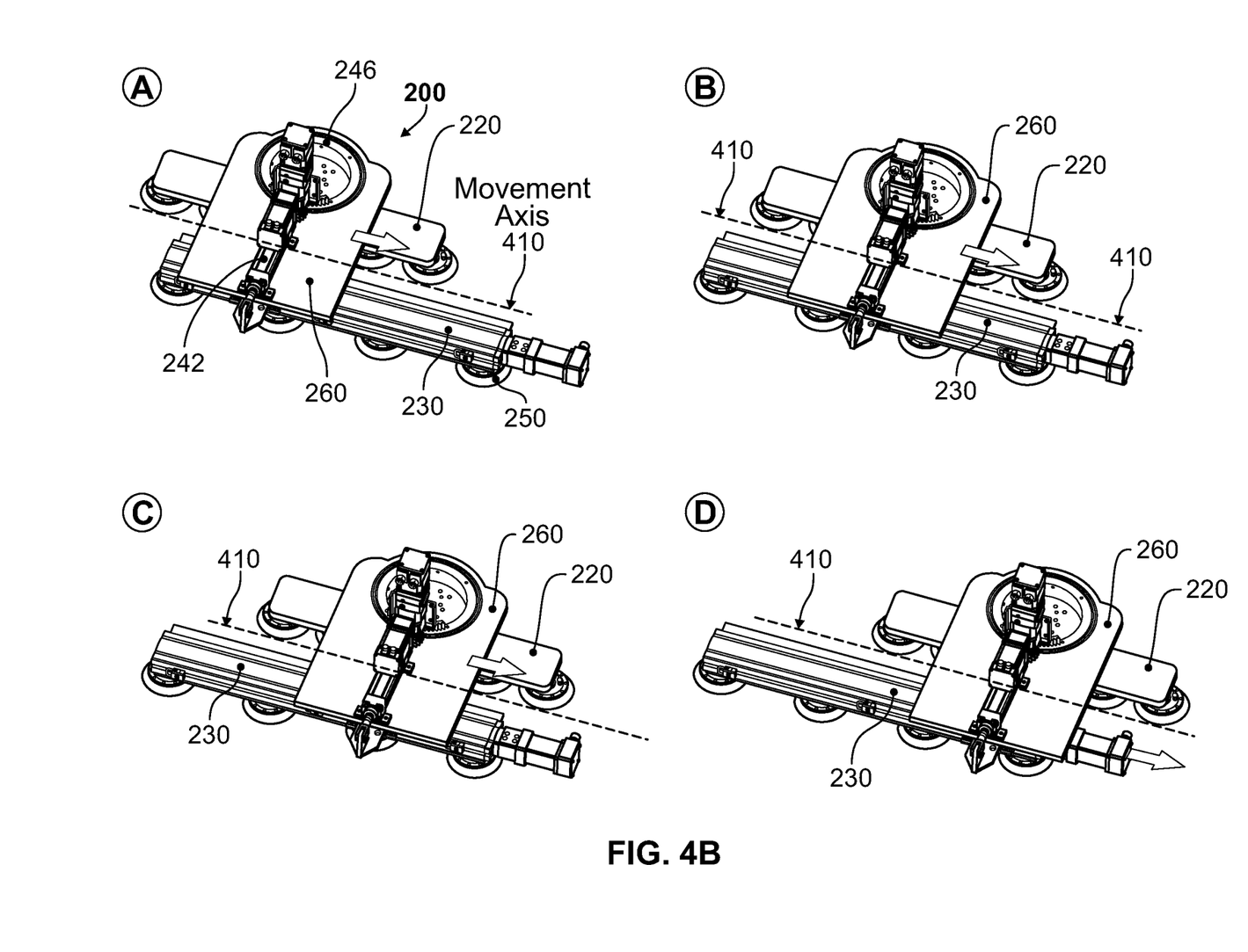
FIG. 4B is a diagram illustrating movement of an autonomous crawling assembly system that comprises multiple dual function movement components after movement course adjustment, in accordance with an advantageous embodiment.

FIG. 4B is a diagram illustrating movement of an autonomous crawling assembly system that comprises multiple dual function movement components after movement course adjustment, in accordance with an advantageous embodiment. Referring to FIG. 4B, there is shown the crawler 200 of FIG. 2.

In operation, after completion of a movement course adjustment (e.g., onto the new movement direction (410)), the crawler 200 may resume applying assembling related functions, such as at multiple locations in accordance with the new movement direction (410), substantially as described with respect to FIG. 3. In this regard, the first movement assembly 220 and the second movement assembly 230 are configured to enable movement of the end effector (210) between the multiple locations along the new movement direction 410. For example, as shown in FIG. 4B, (A) to (D) show an example of a sequence of movements of the end effector (210) and/or adjustment of the movement assemblies during application of assembling related functions by the end effector (210) at the multiple locations along a new direction. As shown in (A), the end effector (210) of the crawler 200 may apply assembling related functions at an initial location of a structure (not shown). In this regard, the end effector (210) may be secured during application of the assembling related functions, the, such as by use of its clamping component (270) and by use of the second movement assembly 230, which enable securing the end effector (210) to the structure by engaging one or more of its dual function movement component(s) 250 to provide 'holding' onto the structure.

In (B), the end effector (210) of the crawler 200 may be moved into another location along direction 410, to apply assembling related functions therein. In this regard, to facilitate movement of the end effector (210), the first movement assembly 220, to which the end effector (210) is attached, may be slid forward (in the direction of movement 410). Sliding the first movement assembly 220 may be performed by engaging its dual function movement component(s) 250 to provide 'gliding' over the structure, as described in FIGS. 1 and 2. Furthermore, to facilitate a secured movement of the end effector (210)—i.e., no skidding—the second movement assembly 230 may be used to secure the crawler 200 to the structure, such as by engaging its dual function movement component(s) 250 to provide 'holding' onto the structure. The connector section 260 may allow for sliding of the portion of the crawler 240 comprising the first movement assembly 220 and the end effector (210) over the main holder (232) of the second movement assembly 230.

In (C), the end effector (210) of the crawler 200 may be moved, again, into yet another location along movement direction 410, in similar manner, to apply assembling related functions therein. In this regard, movement of the end effector (210) may be achieved, again, by sliding the first movement assembly 220, to which the end effector (210), further forward (in the direction of movement 410), while the second movement assembly 230 is being used in securing ('holding') the crawler 200 to the structure.

In (D), as the end effector (210) of the crawler 200 is applying assembling related functions at the current location, the second movement assembly 230 may be slid forward (in the direction of movement 410), such as by sliding its main holder 232 through a rail in the connector section 260. This sliding forward of the second movement assembly 230 may enable continuation of movement of the end effector (210), by 'resetting' the second movement assembly 230 to continue providing 'holding' support while the end effector (210) is being moved (by gliding the first movement assembly 220). In other words, the second movement assembly 230 may be slid forward to return to the initial position depicted in (A). In this regard, sliding the second movement assembly 230 may be performed while the end effector (210) of the crawler 200 is applying assembling related functions. Also, during sliding of the second movement assembly 230, its dual function movement component(s) 250 may be engaged to provide gliding over the structure. Furthermore, during sliding of the second movement assembly 230, the end effector (210) may remain secured, such as use of its clamping component (270) and/or by the first movement assembly 220, such as by engaging its dual function movement component(s) 250 to provide holding onto the structure.

Figure 5A:
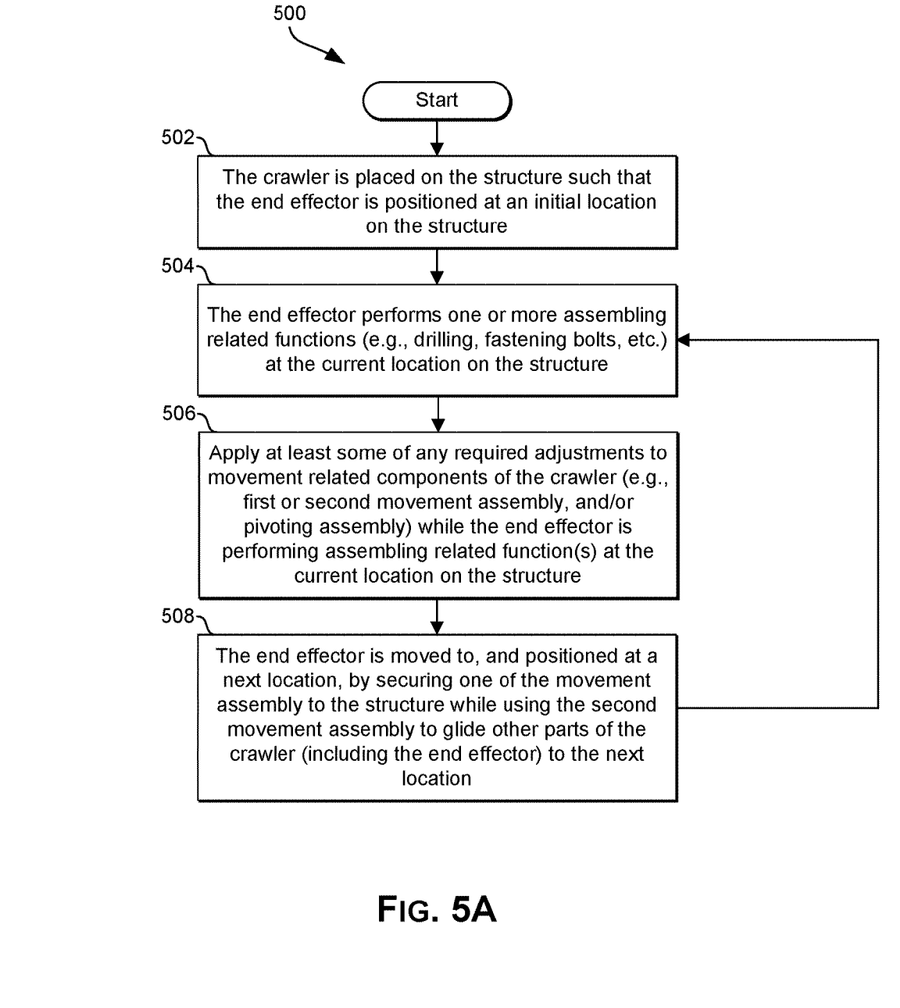
FIG. 5A is a flow chart that illustrates movement of an autonomous crawling assembly system during assembly of structure (e.g., aircraft component), in accordance with an advantageous embodiment.
Figure 5B:
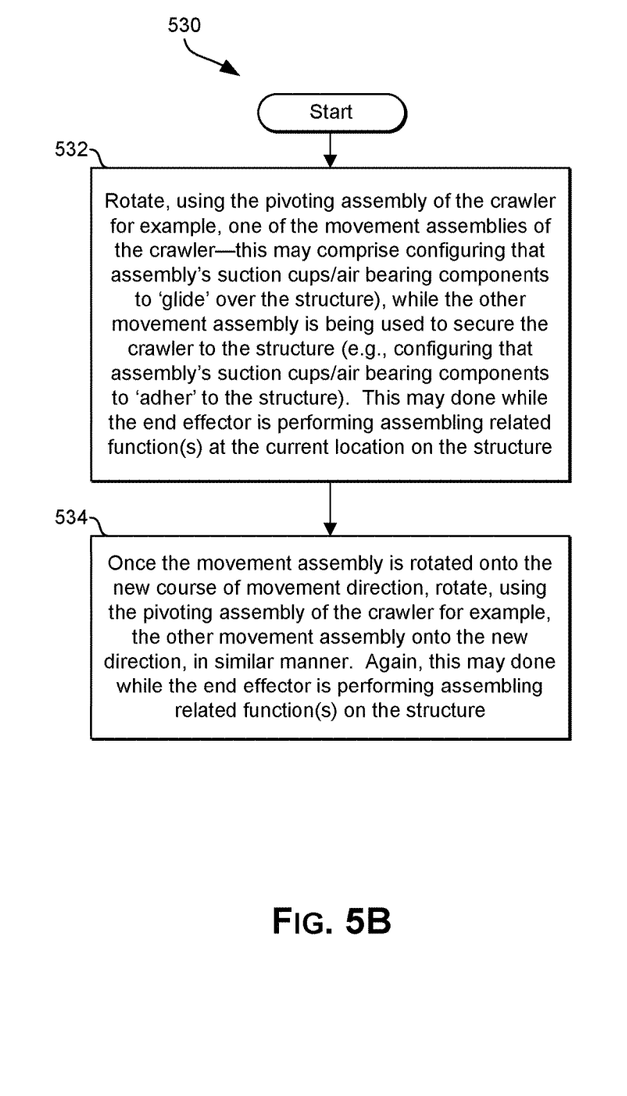
FIG. 5B is a flow chart that illustrates adjustment of direction of movement of an autonomous crawling assembly system during assembly of structure (e.g., aircraft component), in accordance with an advantageous embodiment.

FIG. 5A is a flow chart that illustrates movement of an autonomous crawling assembly system during assembly of structure (e.g., aircraft component), in accordance with an advantageous embodiment. Referring to FIG. 5B, there is shown a flow chart 500 comprising a plurality of steps that may be performed by an automated motorized device (e.g., crawler 200).

In step 502, the crawler (200) may be placed on a structure being assembled (e.g., wing 100), such that the crawler's end effector (210) may be positioned at an initial location on the structure, to perform assembling related functions (e.g., drilling, fastening bolts, etc.). In step 504, the end effector (210) may perform one or more assembling related functions at the current location on the structure. In step 506, at least some of any required configuration to movement related components of the crawler (e.g., the first movement assembly 220, the second movement assembly 230, and/or the pivoting assembly 240) while the end effector (210) is performing assembling related function(s) at the current location on the structure. The configuration may comprise configuring one movement assembly into 'holding' mode and/or configuring the other moving assembly into 'gliding' mode. In step 508, the end effector (210) may be moved to, and positioned at a next location. This may be achieved by, for example, securing one of the movement assembly (the second movement assembly 230) to the structure while using the other movement assembly (the first movement assembly 220) to 'glide' portion of the crawler (including the end effector) to the next location.

FIG. 5B is a flow chart that illustrates adjustment of direction of movement of an autonomous crawling assembly system during assembly of structure (e.g., aircraft component), in accordance with an advantageous embodiment. Referring to FIG. 5B, there is shown a flow chart 530 comprising a plurality of steps that may be performed by an automated motorized device (e.g., crawler 200).

In step 532, one of the movement assemblies of the crawler (e.g., the first movement assembly 220 or the second movement assembly 230) may be rotated, using the pivoting assembly (240) of the crawler for example. The rotating of the movement assembly may comprise configuring, for example, the movement assembly's dual function movement components(s) to 'glide' over the structure, while the other movement assembly is being used to secure the crawler to the structure (e.g., by configuring that assembly's dual function movement components(s) to 'adhere' or 'hold' to the structure). In some instances, rotating a movement assembly may be done while the end effector (210) is performing assembling related function(s) at the current location on the structure—e.g., when rotating a movement assembly that is not connected to the end effector. In step 534, once a movement assembly is rotated onto the new course of movement direction, the other movement assembly may also be rotated onto the new direction, using the pivoting assembly of the crawler, for example, in similar manner.

Other embodiments may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for autonomous crawling assembly system.

Accordingly, the presently disclosed embodiments may be realized in hardware, software, or a combination of hardware and software. The present embodiments may be realized in a centralized fashion in at least one computer system, or in a distributed fashion where different elements are spread across several interconnected computer systems. Any kind of computer system or other system adapted for carrying out the methods described herein is suited. A typical combination of hardware and software may be a general-purpose computer system with a computer program that, when being loaded and executed, controls the computer system such that it carries out the methods described herein.

The presently disclosed embodiments may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While described with reference to certain embodiments, it will be understood by those skilled in the art that various changes may be made and equivalents may be substituted without departing from the scope of the presently described embodiments. In addition, many modifications may be made to adapt a particular situation or material to the teachings without departing from its scope. Therefore, it is intended that the presently disclosed embodiments not be limited to the particular embodiment disclosed, but rather will include all embodiments falling within the scope of the appended claims.

What is claimed is:

1. A method, comprising:
    positioning an end effector of an automated motorized device that is operable to move on a structure for use in assembling of the structure, at each of a plurality of predetermined locations of the structure, wherein:
        the end effector is configured to perform a plurality of assembling related functions, and
        the end effector is configured to apply one or more of the plurality of assembling related functions at each of the plurality of predetermined locations; and
    moving the automated motorized device to each of the plurality of predetermined locations by use of a first movement assembly, a second movement assembly, and a clamping component, wherein:
        the first movement assembly comprises a first elongate main holder and a first plurality of dual function movement components linearly aligned lengthwise along the first elongate main holder, wherein the first movement assembly is linearly movable relative to the second movement assembly within a first plane and rotatable relative to both the second movement assembly and the clamping component about a rotational axis perpendicular to the first plane,
        the second movement assembly comprises a second elongate main holder and a second plurality of dual function movement components linearly aligned lengthwise along the second elongate main holder, wherein the second movement assembly is linearly movable relative to the first movement assembly within a second plane and rotatable relative to both the first movement assembly and the clamping component about a rotational axis perpendicular to the second plane,
        the clamping component is independently operable relative to the first plurality of dual function movement components and the second plurality of dual function movement components,
        functions of each of the dual function movement components comprise adhering and gliding, and
        moving of the automated motorized device comprises securing one of the first movement assembly and the second movement assembly to the structure while the other one of the first movement assembly and the second movement assembly moves over the structure.

2. The method of claim 1, comprising securing, by use of the clamping component, the end effector to the structure during application of the one or more of the plurality of assembling related functions at each of the plurality of predetermined locations.

3. The method of claim 1, comprising securing each of the first movement assembly and the second movement assembly to the structure by engaging one or more dual function movement components to adhere to the structure.

4. The method of claim 3, comprising configuring the one or more dual function movement components to adhere to the structure by creating a vacuum by use of air suction.

5. The method of claim 1, comprising moving each of the first movement assembly and the second movement assembly over the structure, in turn, by configuring one or more dual function movement components to glide over the structure.

6. The method of claim 5, comprising configuring the one or more dual function movement components to glide over the structure by creating a hovering effect by use of air bearing.

7. The method of claim 1, comprising adjusting course of movement of the automated motorized device during operation of the automated motorized device.

8. The method of claim 7, comprising adjusting the course of movement of the automated motorized device by rotating via a pivoting component, which is connected concentrically to the end effector and to at least one of the first movement assembly and the second movement assembly, the end effector and the at least one of the first movement assembly and the second movement assembly while the other one of the first movement assembly and the second movement assembly secures the automated motorized device to the structure.

9. The method of claim 8, comprising adjusting the course of movement of the automated motorized device by rotating via the pivoting component, the other one of the first movement assembly and the second movement assembly onto the adjusted course of movement.

10. A method for fabricating an aircraft component, the method comprising:
positioning an end effector of an automated motorized device that is operable to move on the aircraft component for use in the fabricating of the aircraft component, at each of a plurality of predetermined locations of the aircraft component, wherein:
the end effector is configured to perform a plurality of fabricating related functions, and
the end effector is configured to apply one or more of the plurality of fabricating related functions at each of the plurality of predetermined locations; and
moving the automated motorized device to each of the plurality of predetermined locations by use of a first movement assembly, a second movement assembly, and a clamping component, wherein:
each of the first movement assembly and the second movement assembly comprises an elongate main holder and a plurality of dual function movement components linearly aligned lengthwise along the elongate main holder,
the first movement assembly is linearly moveable relative to the second movement assembly within a first plane and rotatable relative to both the second movement assembly and the clamping component about a rotational axis perpendicular to the first plane,
the second movement assembly is linearly moveable relative to the first movement assembly within a second plane and rotatable relative to both the first movement assembly and the clamping component about a rotational axis perpendicular to the second plane,
the clamping component is independently operable relative to the first plurality of dual function movement components and the second plurality of dual function movement components,
functions of each of the dual function movement components comprise adhering and gliding, and
moving of the automated motorized device comprises securing one of the first movement assembly and the second movement assembly to the aircraft component while the other one of the first movement assembly and the second movement assembly moves over the aircraft component.

11. The method of claim 10, wherein the aircraft component comprises a fuselage, a wing, or a section thereof.

\* \* \* \* \*